THOMSON & RAMSEY.

Check-Row Seed-Planter.

No. 44,472.  Patented Sept. 27, 1864.

Witnesses:

Inventor:
John Thomson
John Ramsey
per Munn & Co
attorneys.

UNITED STATES PATENT OFFICE.

JOHN THOMSON AND JOHN RAMSEY, OF ALEDO, ILLINOIS.

CORN-PLANTER.

Specification forming part of Letters Patent No. 44,472, dated September 27, 1864.

*To all whom it may concern:*

Be it known that we, JOHN THOMSON and JOHN RAMSEY, both of Aledo, in the county of Mercer and State of Illinois, have invented a new and Improved Corn-Planter; and we do hereby declare that the following is a full, clear, and exact description of the same, reference being had to the accompanying drawings, making a part of this specification, in which—

Figure 1:
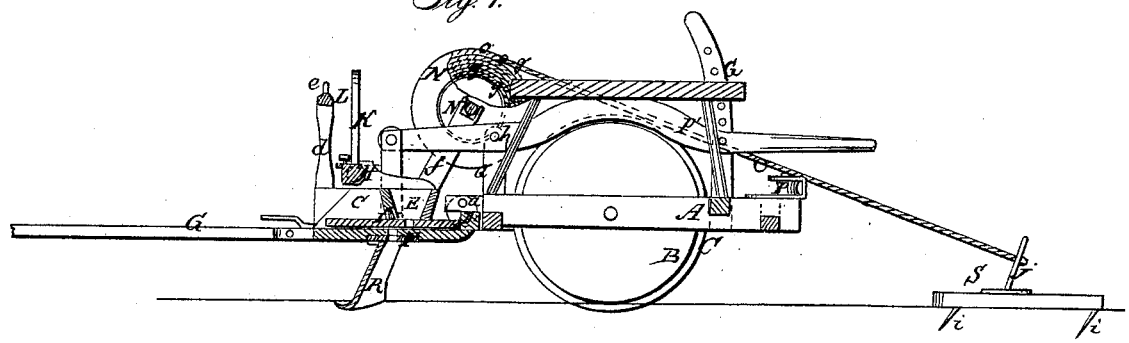
Figure 2:
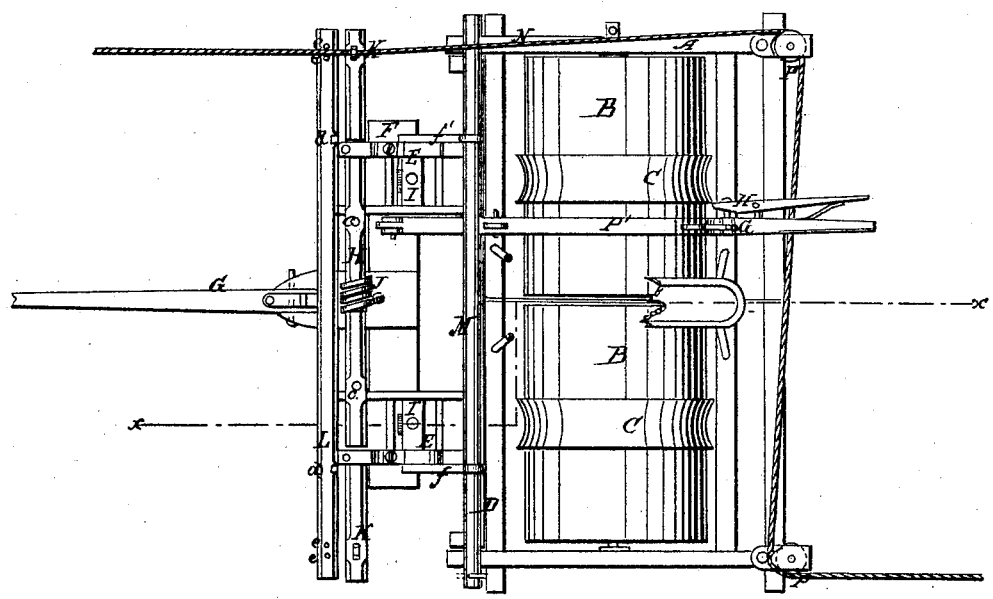

Figure 1 is a side sectional view of our invention, taken in the line $x$ $x$, Fig. 2; Fig. 2, a plan or top view of the same.

Similar letters of reference indicate corresponding parts in the two figures.

This invention relates to a new and useful means for actuating the seed-dropping mechanism, whereby the necessity for furrowing the field previously to dropping the seed in order that the same may be planted in check-rows is obviated, the employment of an attendant to drop the seed dispensed with, and the seed covered and the earth rolled or pressed over it in a perfect manner.

To enable those skilled in the art to fully understand and construct our invention, we will proceed to describe it.

A represents a rectangular frame, in which two rollers, B B, are placed, the latter extending the whole width of the frame, and having each a ring or band, C, upon it, provided with a concave periphery, as shown clearly in Fig. 2. These rollers may be constructed of wood or metal, or both combined.

To the front part of the frame A a bar, D, is attached by pivots $a$. This bar is parallel with the front part of the frame A, and it is allowed to turn freely on its pivot $a$.

To the bar D there are attached at right angles two seed-boxes, E E, which are connected by a bar, F, the latter having the draft-pole G connected to it at its center, and on said seed-boxes there is placed, in suitable bearings, $b$, a shaft, H, which is provided with two pendants, $c$ $c$, the lower ends of which are connected with seed-slides I in the bottoms of the seed-boxes E E. These seed-slides are or may be arranged in the same way as those now used in planters for dropping seed, and they therefore do not require a special description.

J is a spring, which is coiled or wound around the shaft H, and is attached to the bar F. This spring assists in operating or giving a reciprocating movement to the seed-slides I, moving the latter in a backward direction after they have been moved forward through the medium of the shaft H. The shaft H has an upright rod, K, attached to it, one near each end, and the upper parts of said rods are forked. Directly in front of the upper forked ends of the rod K there is a horizontal bar, L, supported by uprights $d$, attached to the seed-boxes E. This bar L has two pins, $e$ $e$, attached to it directly in front of the forks of each rod K.

M is a rod which is attached to oblique supports $f$ $f$, the lower ends of which are secured to the seed-boxes E E, and on either end of this rod there is placed a reel, N, on which a cord or wire, O, is wound, said cord or wire having knots $g$ formed on it at suitable and equal distances apart. The reel N is a'lowed to turn freely on the rod M.

On the back part of the frame A, at each side of the same, there is placed a pulley, P, and around these pulleys the knotted cord or wire passes when the device is at work.

P is a lever, which has its fulcrum $h$ at the upper end of an upright, Q, on the front part of the frame A. The front part of the lever P is connected by a pin, $h$, to an upright, R, on the bar F. This lever P′ extends back over one of the rollers B, and is fitted on a segment-bar, G, which is perforated with holes, said lever having a spring-catch, H, attached to it to fit into any one of the perforations in the bar G. By means of this lever P′ the plows R R, which open the furrows to receive the seed and are attached to the bar F, may be raised up free from the ground when desired. The plows R are in line with the rings or bands C on the rollers, and the seed is dropped by slides I I directly behind the plows R R.

S, Fig. 1, represents what may be termed an "anchor," composed of a bar of wood, provided with spikes $i$ at its under side to be driven into the earth, and having an upright forked bar, $j$, on its upper surface. (See Fig. 1.)

The operation is as follows: The reel N, with the knotted wire or cord O wound upon it, is placed on the rod M and the machine drawn into the field to be planted, and the anchor S is driven into the earth at a furrow, fence, or any straight line, which may be termed a "head-line," at one side of the field. The wire or cord O is then slipped into the forked bar $j$ on the anchor, and is held by a knot, and the machine is drawn along the field at right angles to the head-line, the wire or cord O being paid out as the machine is drawn along, and when the opposite side of the field is reached the reel N is removed from the machine and another anchor, S, fitted in the ground, and the wire or cord O is fitted between the pins e e at one end of the bar L and in the fork of the rod K directly behind the pins, and thence passes around a pulley, P, which is in line with the rod K, and is passed transversely across the back of the frame A and around the other pulley P, and is then fitted in the forked bar j of the anchor last driven in the ground. This position of the wire or cord is shown in red, Fig. 2. The machine is then driven back to the point where the first anchor was secured in the ground, and the knots of the wire or cord O, as the machine is drawn along, force back the rod K, and thereby turn the shaft H, the shaft being returned to its original position each time a knot passes the rod K by the spring J. A reciprocating motion is thereby given the slides I, and two rows of seed are dropped at each passage of the machine across the field. When the place where the first anchor is driven in the ground is reached the wire or cord is taken off from the machine, the latter turned around, the first anchor taken up and placed in the ground the distance of four rows from where it was first secured, the wire or cord placed on the machine as before, and the latter drawn back to the opposite side of the field where the second anchor was driven in the ground. The operation is thus repeated until the whole field is planted.

The wire or cord O, it will be seen, is placed on one side of the machine in going in one direction and placed on the opposite in going in the other direction, hence the necessity of having two forked rods, K, on the shaft H and two pairs of pins, e e, on the bar L.

The rings or bands C, in consequence of having concave peripheries, cover the seed and compact the earth snugly upon it.

Having thus described our invention, what we claim as new, and desire to secure by Letters Patent, is—

The employment or use of a wire or cord, O, provided with knots at a suitable distance apart and applied to the machine substantially as shown, in connection with anchors S, all arranged substantially as and for the purpose set forth.

JOHN THOMSON.
JOHN RAMSEY.

Witnesses:
S. C. AMBERSON,
ALFRED NOBLE.